United States Patent [19]
Kondo

[11] Patent Number: 5,528,570
[45] Date of Patent: Jun. 18, 1996

[54] APPARATUS FOR RECORDING AND REPRODUCING DATA ON A MAGNETO-OPTICAL DISC AT A DATA TRANSFER RATE WHICH IS THE SAME AS THAT OF DATA REPRODUCED FROM A COMPACT DISC

[75] Inventor: Masamichi Kondo, Tokyo, Japan

[73] Assignee: Sony Corporation, Japan

[21] Appl. No.: 201,255

[22] Filed: Feb. 24, 1994

[30]     Foreign Application Priority Data

Feb. 24, 1993  [JP]  Japan ..................... 5-035492

[51] Int. Cl.$^6$ .................................................... G11B 7/00
[52] U.S. Cl. ........................... 369/48; 369/50; 369/60
[58] Field of Search ............................. 369/84, 124, 48, 369/58, 47, 54, 32, 60, 50

[56]              References Cited

U.S. PATENT DOCUMENTS

| | | | |
|---|---|---|---|
| 5,222,054 | 6/1993 | Muraoka et al. | 369/114.28 |
| 5,311,492 | 5/1994 | Tabuchi et al. | 369/84 |
| 5,323,367 | 6/1994 | Tamura et al. | 369/58 |
| 5,331,617 | 7/1994 | Fuma et al. | 369/84 |
| 5,343,452 | 8/1994 | Maeda et al. | 369/47 |
| 5,388,093 | 2/1995 | Yoshida et al. | 369/124 |
| 5,392,265 | 2/1955 | Takezawa | 369/47 |

FOREIGN PATENT DOCUMENTS

| | | |
|---|---|---|
| 0137855A1 | 4/1985 | European Pat. Off. . |
| 0238194A3 | 9/1987 | European Pat. Off. . |
| 0399852A2 | 11/1990 | European Pat. Off. . |
| 0485234A2 | 5/1992 | European Pat. Off. . |
| 0506103A2 | 9/1992 | European Pat. Off. . |
| WO91/14265 | 9/1991 | WIPO . |

OTHER PUBLICATIONS

European Patent Office, Patent Abstracts of Japan, Publ. No. JP4258834, Publ. date Sep. 14, 1992, Class G11B, Subclass 11/10.

*Primary Examiner*—Nabil Z. Hindi
*Attorney, Agent, or Firm*—Limbach & Limbach

[57]              ABSTRACT

An optical disc system uses a recordable MD (mini disc) which can be applied to a multi-media system mass storage, such as a CD-ROM. In an optical disc system in which data of n sectors and added data of m sectors are error-corrected in a CIRC (Cross Interleave Reed-Solomon code) fashion and error-corrected data is recorded on an MD 16 in units of L+n+m sectors (L is the number of link sectors), when data is recorded and/or reproduced, a rotational speed of the MD 16 is selected to be (L+m+n) times at least. When n is 32 sectors, m is 1 sector, and L is 3 sectors then the rotational speed is 9/8 times and a maximum data transfer rate is selected to be 150 kB/s. In this way, data in a CD-ROM 10 can be recorded on the MD 16 at substantially the same transfer rate as the maximum data transfer rate (150 kB/s) of the CD-ROM 10.

15 Claims, 4 Drawing Sheets

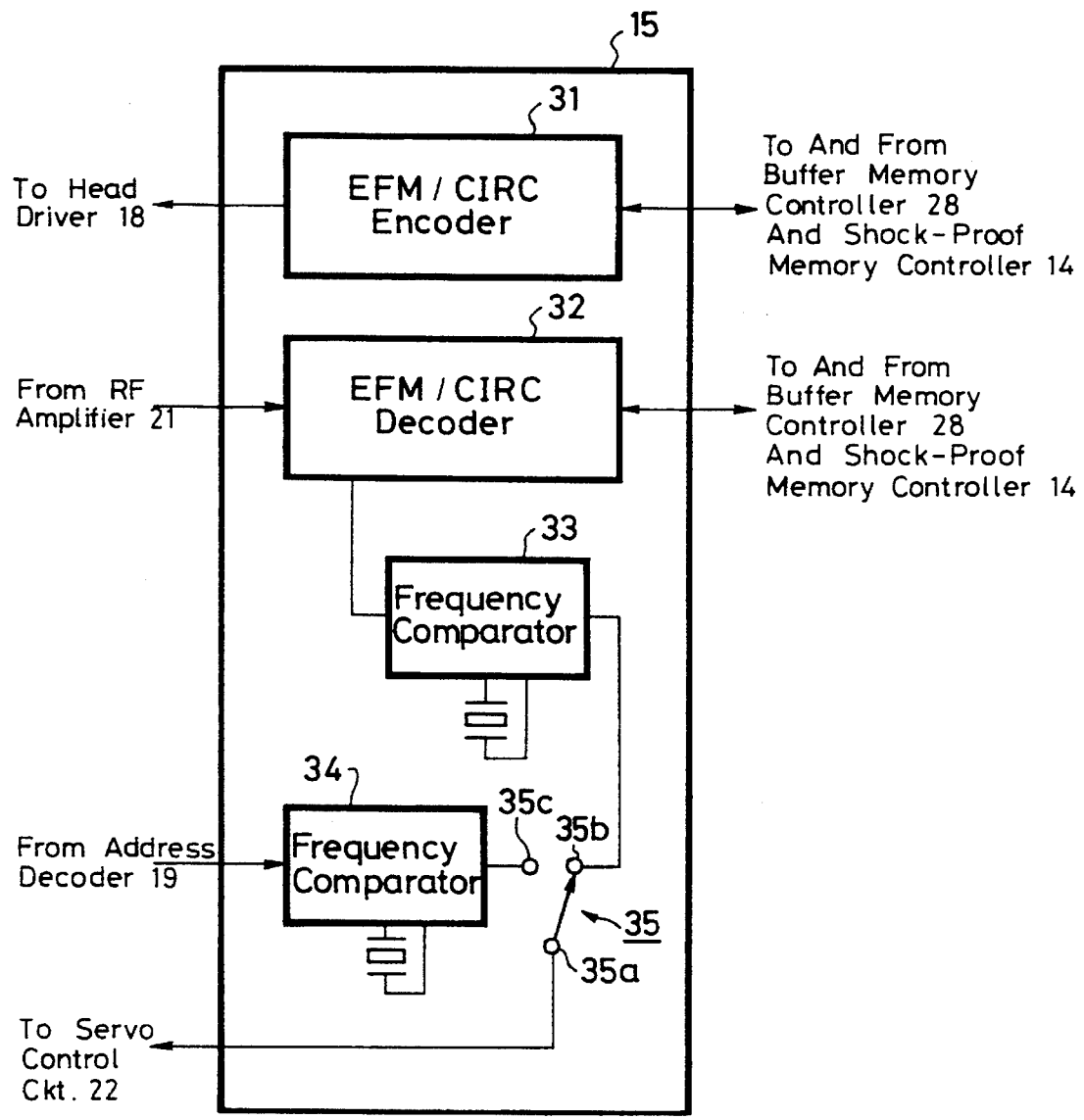

5,528,570

APPARATUS FOR RECORDING AND REPRODUCING DATA ON A MAGNETO-OPTICAL DISC AT A DATA TRANSFER RATE WHICH IS THE SAME AS THAT OF DATA REPRODUCED FROM A COMPACT DISC

BACKGROUND OF THE INVENTION

1. Field of the Invention

The present invention relates to an optical disc system suitable for use with a so-called Sony Mini Disc (hereinafter referred to as an MD) system, for example.

2. Description of the Related Art

MDs that are now available on the market are generally classified as, for example, an MD from which recorded music can be reproduced only in use (hereinafter referred to as a pre-mastered MD when necessary) and an MD on which the user can freely record desired information (hereinafter referred to as a recordable MD when necessary).

The recordable MD according to the Sony Mini Disc format has one frame formed of 24 bytes and one sector formed of 98 frames. In this case, an interleaving length of a CIRC (Cross Interleave Reed-Solomon Code) as an error correction code is 108 frames, which is longer than one sector. Therefore, when data is recorded on the recordable MD, 3 sectors between adjacent data recording areas must be used as "useless sectors". The area of the "useless sector" area is called a link area. In other words, if 108 frames were not prepared before and after data were recorded respectively, then the interleaving would not be completed. For this reason, the link area of 3 sectors must be provided between the adjacent data recording areas.

If data is recorded on the recordable MD from any position, then the link areas are scattered on many portions of the recordable MD, thereby deteriorating a utilization factor of the recordable MD. For this reason, data is recorded on the recordable MD at recording units of a certain large data amount. In the recordable MD, this recording unit is called a cluster and one cluster is formed of 36 sectors. In one cluster, the leading 3 sectors are assigned to sectors of the above link area (leading 3 sectors will hereinafter be referred to as link sectors), and the next 1 sector is assigned to sector for sub data which is added data (this sector will hereinafter be referred to as a sub data sector. The remaining 32 sectors are assigned to data recording sectors.

FIG. 1 shows a data format of about one cluster of the recordable MD thus described. As shown in FIG. 1, 1 cluster includes a link area having link sectors LS formed of 3 sectors, a sub data sector SS formed of one sector and a data area formed of data sectors DS formed of 32 sectors.

In the pre-mastered MD, all data are written by one access and 3 sectors of the link area are not necessary. Therefore, the 4 leading sectors are all assigned to the sub data sector SS. On the sub data sector SS are recorded graphic data, text data of a recorded musical accompaniment for amateur singers (so-called KARAOKE) and so on. Thus, it is used for KARAOKE and so on.

The inventor of the present application has an idea that the recordable MD can be used as a mass storage in and from which general data can be recorded and reproduced.

Reproducible CD-ROMs are generally used as mass storage of general data.

A format of the CD-ROM will be described below. One frame thereof is formed of 24 bytes, and 1 sector is formed of 98 frames. A disc is rotated in a CLV (constant linear velocity) fashion and its linear velocity is 1.2 to 1.4 m/s, which is the same as the existing MD system.

Therefore, it is considered that, if data on the CD-ROM were transferred to the recordable MD of the MD system and the data thus transferred to the recordable MD were transferred from the MD system to the hardware which reproduces the CD-ROM, then the transferred data could be processed as though the CD-ROM were directly played back by the above hardware.

However, since all data are recorded on the CD-ROM by a stamper in one process, the link area of 3 sectors need not be provided. Further, the sub data sector of 1 sector also is not provided. There is then the problem that a substantial data transfer rate of the MD system is lowered to 8/9 (=(36−4)/36) as compared with 150 kB/s of the maximum average data transfer rate of the CD-ROM. Therefore, the MD system cannot be applied to the existing software/hardware system that was produced on the basis of the data transfer rate of the CD-ROM, such as a moving picture made by the MPEG (moving picture image coding experts group) or the like.

OBJECTS AND SUMMARY OF THE INVENTION

It is therefore an object of the present invention to provide an optical disc system in which the aforesaid shortcomings and disadvantages encountered with the prior art can be eliminated.

It is another object of the present invention to provide an optical disc system which uses a recordable MD as a multi-media system mass storage, such as a CD-ROM or the like.

According to a first aspect of the present invention, there is provided an optical disc apparatus for recording or reproducing data on or from an optical disc which is formatted such that the optical disc is recorded or reproduced while being rotated at a described rotational speed S. This optical disc apparatus is comprised of error correcting means for error-correcting data of n sectors and added data of m sectors in a CIRC error correction fashion, means for recording or reproducing the data error-corrected in a CIRC error correction fashion on or from the optical disc in units of (L+n+m) sectors, and means for rotating the optical disc at a rotational speed of S(L+m+n)/n.

In accordance with a second aspect of the present invention, there is provided an optical disc system which is comprised of a first optical disc apparatus, a second optical disc apparatus and a computer connected to the first and second optical disc apparatus. The first optical disc apparatus is comprised of first error correcting means for error-correcting data of n sectors and added data of m sectors in a CIRC error correction fashion, means for recording or reproducing the data error-corrected in a CIRC error correction fashion on or from a first optical disc, and means for rotating the first optical disc at a predetermined rotational speed S. The second optical disc apparatus is comprised of second error correcting means for error-correcting data of n sectors and added data of m sectors in a CIRC error correction fashion, means for recording or reproducing the data error-corrected in a CIRC error correction fashion on or from a second optical disc at the unit of (L+n+m) sectors, and means for rotating the second optical disc at a rotational speed of S(L+m+n)/n.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 4 is a schematic block diagram showing a specific example of an EFM/CIRC encoder/decoder used in the present invention.

DETAILED DESCRIPTION OF THE PREFERRED EMBODIMENT

An optical disc system according to an embodiment of the present invention will be described below with reference to the accompanying drawings.

Figure 2:
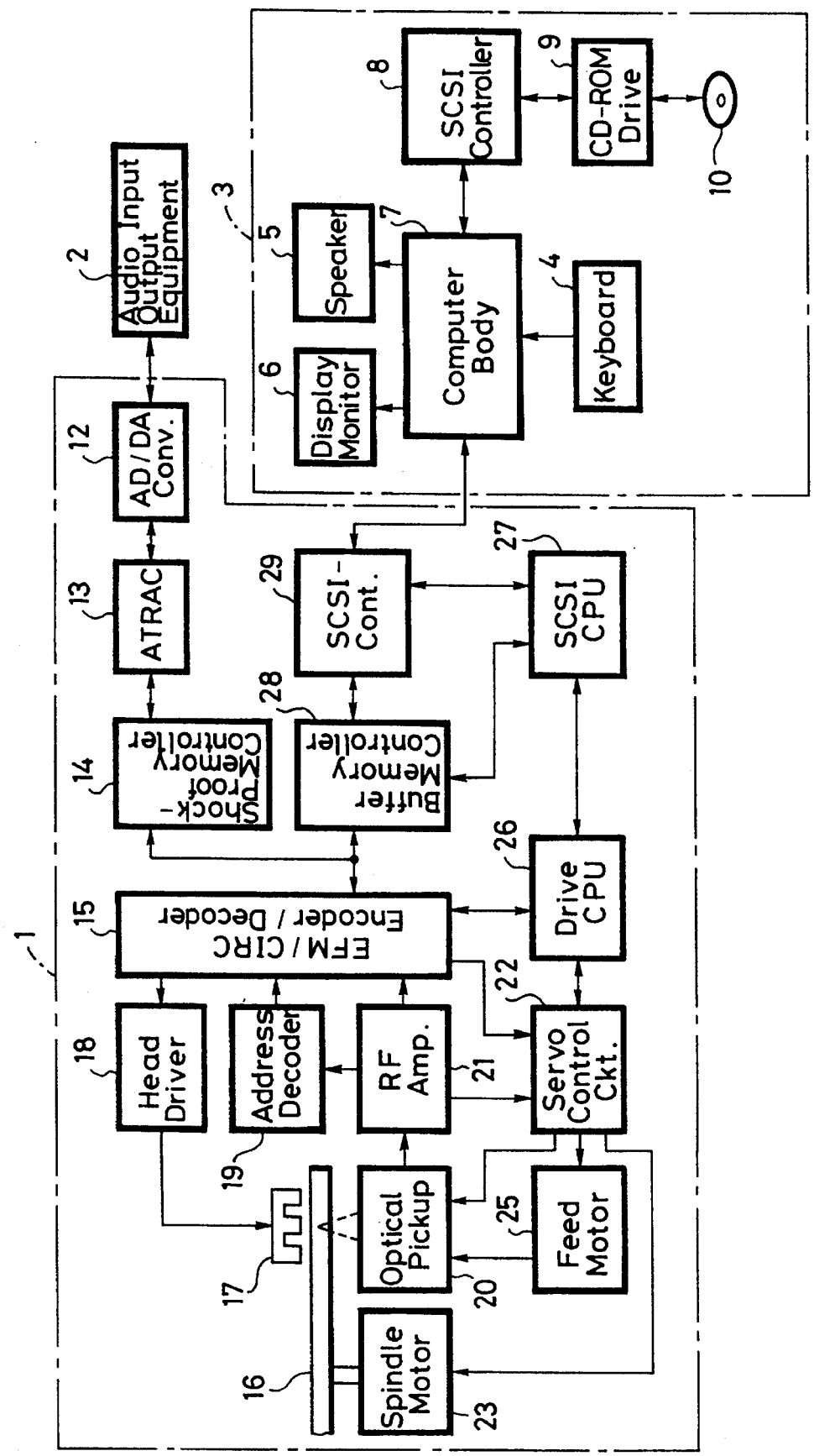
FIG. 2 is a schematic block diagram showing an arrangement of an optical disc system according to an embodiment of the present invention in which the optical disc system is applied to an MD system.

FIG. 2 shows in block form an example in which the optical disc system according to the embodiment of the present invention is applied to the MD system.

As shown in FIG. 2, the MD system generally comprises an MD disc drive 1, an audio input and output equipment 2 connected to the MD disc drive 1 and a data input and output equipment 3 connected to the MD disc drive 1. In this MD system, a disc is rotated in a CLV fashion.

The audio input and output equipment 2 is what might be called a component stereo system having an amplifier, a speakers and a tuner not shown.

The data input and output equipment 3 includes a computer body 7 having a keyboard 4, a speaker 5 and a display monitor 6 connected thereto and a CD-ROM drive 9 connected to the computer body 7 through an SCSI (small computer signal interface) controller 8. A CD-ROM 10, which is provided as a recording medium, can be loaded on and unloaded from the CD-ROM drive 9.

A specification of the CD-ROM 10 will be described below. A diameter of the disc is 12 cm, and the maximum average data transfer rate thereof is 150 kB/s. All code data are written on the CD-ROM 10 at one time. One frame of the CD-ROM 10 is formed of 24 bytes, and one sector is formed of 98 frames. The disc is rotated in a CLV fashion, and a linear velocity $V_1$ thereof is selected to be $V_1=1.2\sim1.4$ m/s. The linear velocity $V_1$ is equal to a linear velocity $V_2$ required when the MD disc drive 1 corresponds with the audio input and output equipment 2. The linear velocity $V_2$ will hereinafter be referred to as an audio corresponding linear velocity when necessary. In this embodiment, in order that the MD disc drive 1 may correspond with the data input and output equipment 3 which handles the CD-ROM 10, a linear velocity $V_3$ of the MD disc drive 1 is set to $V_3=V_2\times 9/8=V_1\times 9/8$ times. The linear velocity $V_3$ will hereinafter be referred to as a CD-ROM corresponding linear velocity when necessary.

Referring to FIG. 2, the audio input and output equipment 2 is connected through a converter (AD/DA CONV.) 12 and an audio compression encoder/decoder (ATRAC) 13 to a shock-proof memory controller 14 including a RAM (random access memory).

The converter 12 operates as a D/A (digital-to-analog) converter when it supplies a signal to the audio input and output equipment 2, and operates as an A/D (analog-to-digital) converter when it is supplied with a signal from the audio input and output equipment 2.

The audio compression encoder/decoder 13 operates as a decoder for expanding audio data when it supplies a signal to the audio input and output equipment 2, and operates as an encoder for compressing audio data when it is supplied with a signal from the audio input and output equipment 2. The audio compression encoder/decoder 13 uses an encoding based on an ATRAC (adaptive transform acoustic coding) system.

The shock-proof memory controller 14 is connected to an EFM/CIRC encoder/decoder 15.

A transfer rate at which data is supplied from the EFM/CIRC encoder/decoder 15 to the RAM of the shock-proof memory controller 14 is 1.4 Mb/s if the MD disc drive 1 operates at the conventional audio corresponding linear velocity $V_2$. Also, a transfer rate at which data is output from the RAM of the shock-proof memory controller 14 to the audio compression encoder/decoder 13 is 0.3 Mb/s. Therefore, even when the MD disc drive 1 is considerably shocked so that a digital signal on a mini disc (hereinafter simply referred to as an MD) 16 cannot be read, it becomes possible to continuously supply data from the shock-proof memory controller 14 to the audio compression encoder/decoder 13 for about 3 seconds. Thus, a sound can be continuously emanated from a speaker (not shown) in the audio input and output equipment 2.

The EFM/CIRC encoder/decoder 15 encodes (i.e., EFM-modulation and CIRC error correction coding) input data supplied thereto from the shock-proof memory controller 14 or a buffer memory controller 28 and supplies encoded data through a head driver 18 to a magnetic recording head 17.

The MD 16 on which data is recorded by the magnetic recording head 17 is rotated by a spindle motor 23 at the constant linear velocity V3 described above.

Figure 1:
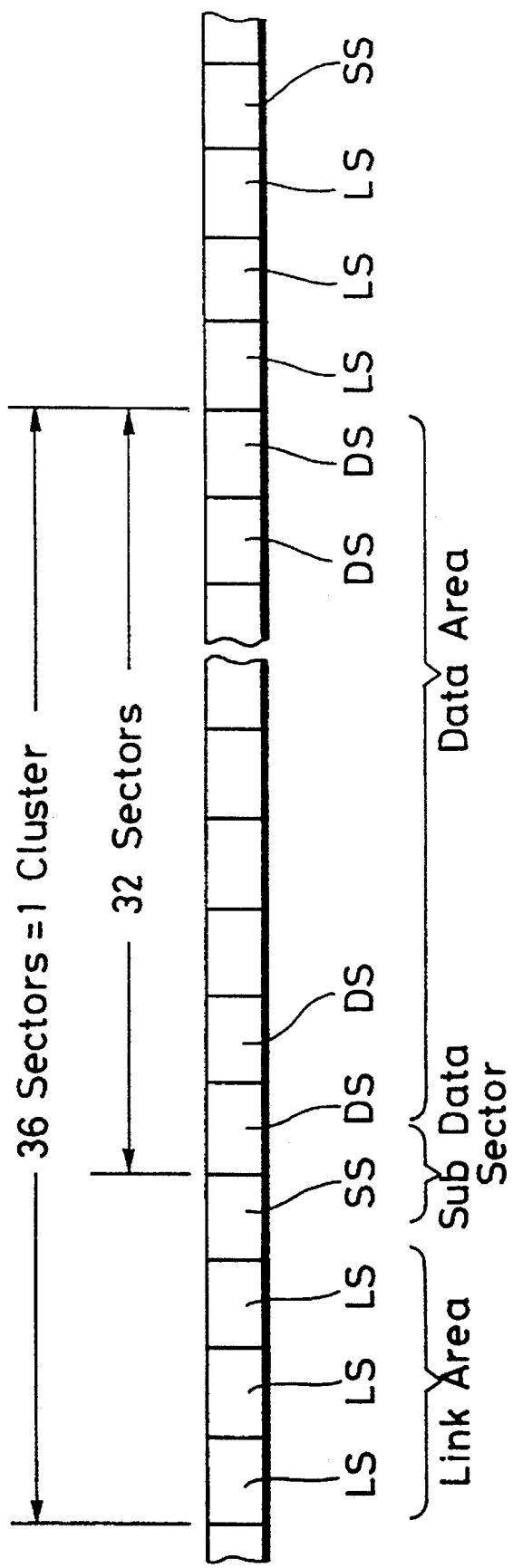
FIG. 1 is a schematic diagram showing a data format of substantially one cluster of a recordable MD according to the Sony Mini Disc System format.
Figure 3:
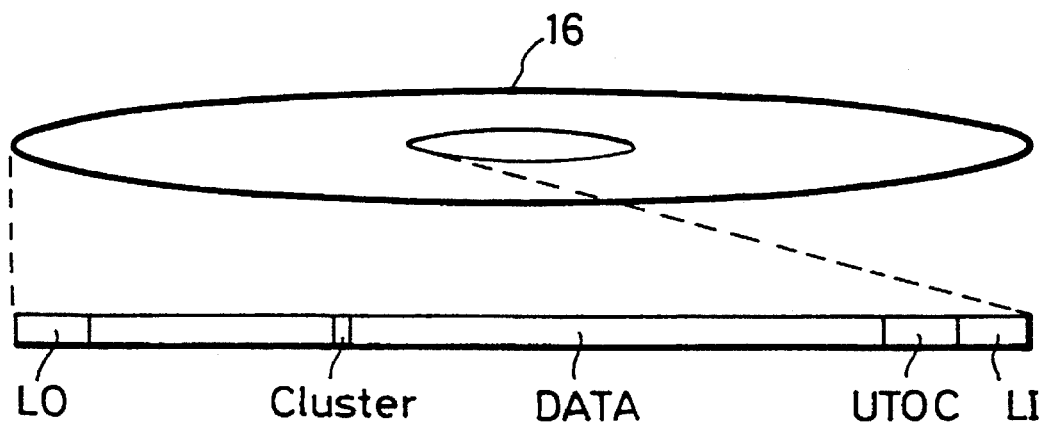
FIG. 3 is a schematic diagram used to explain a recording area or the like of the MD in the optical disc system shown in FIG. 2.

As shown in FIG. 3, the recordable MD 16 includes a lead-in area L1, a user TOC area UTOC, a data area DATA and a lead-out area LO, in that order from the inside of the radial direction thereof. In the data area DATA, as shown in FIG. 1, the recording unit is one cluster unit and 1 cluster includes 36 sectors. Of 36 sectors, one sector is allocated to the sub data sector SS serving as data to be added, 32 sectors are allocated to the data sectors DS for compressed data and 3 sectors are allocated as link sectors LS. One sector is formed of 98 frames and one frame is formed of 24 bytes.

The interleaving length of the CIRC serving as an error correction code is 108 frames and is longer than 1 sector. Therefore, when data is recorded, 3 sectors between adjacent data recording areas must be used as so-called "useless sectors". The area of these "useless sectors" is called a link area. In other words, if 108 frames (one sector+α) are not provided respectively before and after data is recorded, then the interleaving will not be completed. Therefore, the link area of 3 sectors must be prepared between adjacent data recording areas.

The optical disc is not limited to the recordable MD (erasable optical disc), and the pre-mastered MD and other optical discs, such as a write once optical disc or the like may be used.

The digital signal is recorded on or reproduced from the recordable MD 16 (rotated at the described constant linear velocity $V_3$) by using an optical pickup 20 having an objective lens (not shown) and the magnetic recording head 17 thereto.

Data is recorded on the pre-mastered MD such that a fundamental frequency of a reproduced signal from the pit becomes 4.32 MHz when data is read out from the MD which is rotated at the described linear velocity.

In the recordable MD, pregrooves that zigzag at 22.05 kHz when the MD is rotated at the described linear velocity are formed on the whole periphery of the track thereof.

A signal corresponding to such pregrooves is reproduced by the optical pickup 20, amplified by an RF amplifier 21, converted into binary data, and then supplied to the address decoder 19. An address signal and a carrier signal are supplied from the address decoder 19 to the EFM/CIRC encoder/decoder 15.

A specific example of the EFM/CIRC encoder 15 will be described below with reference to FIG. 4.

As shown in FIG. 4, when the MD 16 is a recordable MD, a switch 35 connects a movable contact 35a to a fixed contact 35c to output an output signal from a frequency comparator 34 in the EFM/CIRC encoder 15. The frequency comparator 33 phase-compares a signal derived from the pregrooves by the address decoder 19 and a reference clock signal having a frequency of $22.05 * 9/8 = 24.81$ kHz and supplies a compared result through the fixed contact 35c of the switch 35 to a servo controller 22 (see FIG. 2). Thus, the rotational speed of the spindle motor 23 is servo-controlled such that the linear velocity of the MD 16 is held at the predetermined linear velocity $V_3$.

The reason that the signal having a frequency of 24.81 kHz is used as the reference clock signal is that the frequency of the reproduced signal from the pit is 9/8 times 22.05 kHz because the disc is rotated at a rotational speed 9/8 times the rotational speed S described according to the MD format. Characteristic curves for rotational speeds S and (9/8)*S are described below in connection with FIG. 5.

The case that the MD 16 is a pre-mastered MD will be described below. The address decoder 19 (see FIG. 2) is used only when the MD 16 is a recordable MD, and is not used when the MD 16 is a pre-mastered MD. When the MD 16 is a pre-mastered MD, the binary RF signal from the RF amplifier (see FIG. 2) 21 is supplied to an EFM/CIRC decoder 32 in the EFM/CIRC encoder/decoder 15 and the switch 35 connects the movable contact 35a to the fixed contact 35b to output an output signal of a frequency comparator 33.

The frequency comparator 33 phase-compares a fundamental frequency of a reproduced signal and a reference clock signal having a frequency of $4.32 \text{ MHz} * 9/8 = 4.86 \text{ MHz}$ and supplies its compared result through the fixed contact 35b of the switch 35 to the servo controller 22. Thus, the rotational speed of the spindle motor 23 is servo-controlled such that the linear velocity of the MD 16 is held at the predetermined linear velocity $V_3$.

The output RF signal of the RF amplifier 21 is supplied to a focus tracking servo circuit (not shown) of the servo controller 22 and an output signal from the focus tracking servo circuit is supplied to the optical pickup 20, thereby the focus tracking servo is effected. Also, a feed servo, i.e., seek operation or the like is effected by driving the feed motor 25 under the control of the servo controller 22.

The servo controller 22 and the EFM/CIRC encoder/decoder 15 are operated under the control of a drive CPU (central processing unit) 26 so that the frequency or the like is changed as described above. The drive CPU 26 is connected to a SCSI-CPU 27.

The SCSI-CPU 27 is connected to the buffer memory controller 28 having the RAM memory and an SCSI controller 29 so that the buffer memory controller 28 and the SCSI controller 29 are operated under the control of the SCSI-CPU 27.

The buffer memory controller 28 and the SCSI controller 29 connected in series are provided in association with the data input and output equipment 3. The buffer memory controller 28 is connected to the EFM/CIRC encoder/decoder 15, and the SCSI controller 29 is connected to the data input and output equipment 3.

The data input and output equipment 3 uses the CD-ROM 10 as a medium. Data is read out from the CD-ROM 10 by the CD-ROM drive 9 and the data thus read is supplied through the SCSI controller 8 to the computer body 7 at the maximum average data transfer rate of 150 kB/s. In order for the data, which was read out from the CD-ROM 10 and supplied from the computer body 7 to the MD disc drive 1, to be recorded on the MD 16, reproduced from the MD 16, and then displayed on the display monitor 6 of the computer body 7 as if it were reproduced from the CD-ROM 10, the transfer rate at which the data reproduced from the MD 16 is supplied through the SCSI controller 29 to the computer body 7 must become the above-mentioned transfer rate of 150 kB/s.

The data from the CD-ROM 10 is recorded on the recordable MD 16 at its data area having 32 data sectors DS per cluster (i.e., 36 sectors), and is not recorded on the link area having 3 link sectors LS and one sub data sector SS, as earlier noted with reference to FIG. 1. Thus, if the MD 16 is only rotated at the linear velocity of the MD disc drive 1, i.e., at the above audio corresponding linear velocity $V_2$, the transfer rate at which the data is supplied from the SCSI controller 29 to the computer body 7 is substantially decreased to $32/36 = 8/9$ times.

Therefore, in order to match the transfer rate of 150 kB/s, when data from the CD-ROM 10 is recorded on and reproduced from the MD 16, the linear velocity $V_2$ must be increased to the linear velocity $V_3$ of $36/32 = 9/8$ times.

To increase the linear velocity $V_2$ of the recordable disc to the linear velocity $V_3$, the reference clock frequency 22.1 kHz in the comparing circuit in the EFM/CIRC encoder/decoder 15 must be changed to $22.1 \text{ kHz} \times 9/8$ times such that the frequency of the FM carrier signal supplied from the address decoder 19 when the spindle servo motor 23 of the recordable MD 16 is servo-controlled becomes $22.1 \text{ kHz} \times 9/8$ times. This is accomplished by moving the setting switch 35 to move contact 35a to connect to contact 35c (see FIG. 4).

Figure 5:
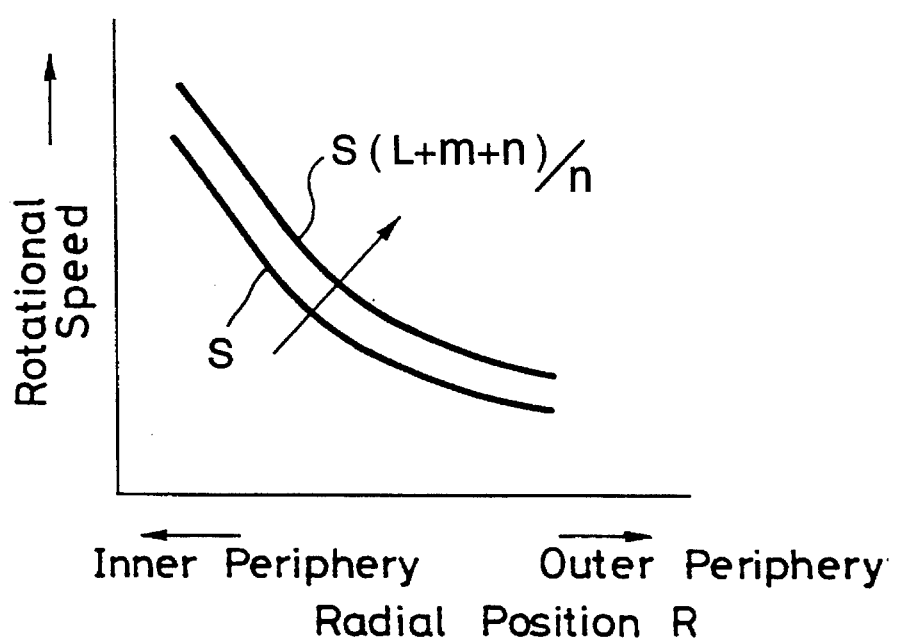
FIG. 5 is a diagram showing characteristic curves obtained when changes of linear velocities are converted into changes of rotational speeds.

FIG. 5 is a diagram showing characteristic curves obtained when changes of the linear velocities $V_2$, $V_3$ are respectively converted into changes of rotational speeds S and S(L+m+n)/n. Note that in the embodiment described above S(L+m+n)/n is (9/8)*S. The rotational speeds S and S(L+m+n)/n are obtained by respectively dividing the linear velocities $V_2$, $V_3$ with $2\pi R$ (R represents a radius position of the MD 16).

To increase the linear velocity $V_2$ of the pre-mastered MD 16 to the linear velocity $V_3$ of 9/8 times, the frequency 4.32 MHz of the reference clock signal in the EFM/CIRC encoder/decoder 15 must be changed to $4.32 \text{ MHz} \times 9/8$ times. In this case, even when the pre-mastered MD 16 is rotated at the linear velocity $V_3$, a sound can be correctly reproduced from the speaker of the audio input and output equipment 2 by controlling the data input and output timing with the shock-proof memory controller 14.

By controlling the linear velocity (rotational speed) of the MD 16 as described above, even when the existing software/hardware system which was produced on the basis of the data transfer rate 150 kB/s of the CD-ROM 10, such as the moving picture based on the MPEG or the like, is applied to the MD disc drive 1, the above existing software/hardware system can be handled similarly to the CD-ROM 10. Consequently, data recorded on a plurality of CD-ROMs 10 can be edited and recorded, for example, on the MD 16. Then, data, edited and recorded on the MD 16, can be correctly reproduced by the display monitor 6 or speaker 5. That is, the MD 16 can be used as a multi-media mass storage for CD-ROM 10.

While the linear velocity of the MD 16 is set to be (L+m+n)/n times, i.e., % times as described above, the present invention is not limited thereto and the following variant is also possible. That is, the optical disc apparatus according to the present invention includes the shock-proof memory controller 14 and the buffer memory controller 28. Therefore, if the linear velocity is (l+m+n)/n times or higher, then similar effects can be achieved by changing a frequency of a write clock and a frequency of a read clock thereof.

According to the above-mentioned embodiment, the recordable MD has data of 32 sectors (generally n sectors), and added data of one sector (generally m sectors), and L linking sectors (L=3). These are processed in a CIRC error correction fashion and data is recorded as a recording unit (1 cluster) of 36 sectors made up of L+n+m sectors. When data from the CD-ROM 10 (external multi-media, such as the data input and output equipment 3, although not audio input and output equipment 2) is recorded on or reproduced from the recordable MD 16, the linear velocity (rotational speed) of the MD 16 is set to be % times at least (generally (L+M+n)/n times at least). Therefore, all data that had been error-corrected in a CIRC error correction fashion and recorded on the recording medium, such as the CD-ROM 10 or the like, can be recorded or reproduced by a single access of the recordable MD 16 at substantially the same rate as the maximum average data transfer rate of the CD-ROM 10.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An optical disc apparatus for recording or reproducing data on or from an optical disc which is formatted such that said optical disc is recorded or reproduced while being rotated at a predetermined rotational speed S, and such that data is grouped into clusters where each cluster has L link sectors, m sub data sectors and n data sectors, the optical disc apparatus comprising:

error correcting means for error-correcting data of n sectors and added data of m sectors in a Cross Interleave Reed Solomon Code error correction fashion;

means for recording or reproducing the error-corrected data on or from said optical disc in units of (L+m+n) sectors; and means for rotating said optical disc at a rotational speed of S(L+m+n)/n.

2. The optical disc apparatus according to claim 1, further comprising a buffer memory in which the error-corrected data output from said error correcting means is written in response to a first clock and from which stored data is read in response to a second clock which is different from said first clock.

3. The optical disc apparatus according to claim 1, wherein n is 32, m is 1 and L is 3.

4. In an optical disc system comprising a first optical disc apparatus, a second optical disc apparatus and a computer connected to said first and second optical disc apparatus, said first optical disc apparatus for recording data on a first optical disc, and said second optical disc apparatus for recording or reproducing data on a second optical disc, where the data of the second optical disc is grouped into clusters where each cluster has L link sectors, m sub data sectors and n data sectors, the first optical disc apparatus comprising:

means for reproducing the data from the first optical disc;

first rotating means for rotating said first optical disc at a predetermined rotational speed S; and said second optical disc apparatus comprising:

error correcting means for error-correcting data of n sectors and added data of m sectors in a Cross Interleave Reed Solomon Code (CIRC) error correction fashion;

means for recording or reproducing the data error-corrected in a CIRC error correction fashion on or from the second optical disc in units of (L+m+n) sectors; and second rotating means for rotating said second optical disc at a rotational speed of S(L+m+n)/n.

5. The optical disc system according to claim 4, wherein said first optical disc apparatus is a compact disc drive, and said second optical disc apparatus is a recordable optical disc drive.

6. The optical disc system according to claim 4, wherein said second optical disc apparatus further includes a buffer memory in which error corrected data from said second error correcting means is written in response to a first clock and from which stored data is read in response to a second clock which is different from said first clock.

7. The optical disc system according to claim 4, wherein n is 32, is 1 and L is 3.

8. An optical disc recording and reproducing apparatus for recording or reproducing an optical disc which is formatted as a recordable disc which can be recorded or reproduced at a constant linear velocity V, such that data is recorded on the optical disc in clusters, with each cluster having L sectors of link data, m sectors of sub data and n data sectors, the optical disc recording and reproducing apparatus comprising:

rotating means for rotating the optical disc to have a constant linear velocity of V(L+m+n)/n;

recording means for recording data on the optical disc while the optical disc is rotated by the rotating means;

reproducing means for reproducing data from the optical disc while the optical disc is rotated by the rotating means; and data input/output means for inputting data to the recording means at a first maximum average data transfer rate, and for outputting data from the reproducing means at the first maximum average data transfer rate.

9. The optical disc recording and reproducing apparatus according to claim 8, wherein the first maximum average data transfer rate is 150 kB per second.

10. The optical disc recording and reproducing apparatus according to claim 8, wherein the first maximum average data transfer rate is defined to be substantially the same as a maximum average data transfer rate for a compact disc ROM (CD-ROM) system.

11. An optical disc system comprising a compact disc (CD) apparatus, a magneto-optical (MO) disc apparatus and a computer connected to the CD apparatus and the MO disc apparatus, wherein the CD apparatus includes:

first reproducing means for reproducing data from a CD while rotating the CD at a constant linear velocity V to reproduce data from the CD at a predetermined data transfer rate; and output means to output the reproduced data from the first reproducing means to the computer; and wherein the MO disc apparatus includes:

means for recording or reproducing on or from an MO disc in units of (L+n+m) sectors while rotating the MO disc to have a constant linear velocity of V(L+m+n)/n, such that data on the MO disc is grouped into clusters where each cluster has L link sectors, m sub data sectors and n data sectors, whereby data is received for recording on the MO disc at the predetermined transfer rate and is output from reproduction at the predetermined data transfer rate;

error correcting means for error-correcting data in the clusters of (L+m+n) sectors in a Cross Interleave Reed Solomon Code (CIRC) error correction fashion; and input/output means for inputting data from the computer at a the predetermined data transfer rate, and for outputting data to the computer at the predetermined data transfer rate.

12. The optical disc system according to claim 11, wherein the MO disc apparatus further includes a buffer memory in which output data from the error correcting means is written in response to a first clock and from which stored data is read in response to a second clock which is different from the first clock.

13. The optical disc system according to claim 11, wherein n is 32, m is 1, and L is 3.

14. An optical disc apparatus for recording or reproducing data on or from an optical disc which is formatted such that said optical disc is recorded or reproduced while being rotated at a predetermined rotational speed S, and such that data is grouped into clusters where each cluster has L link sectors, m sub data sectors and n data sectors, the optical disc apparatus comprising:

error correction means for error-correcting data of n sectors and added data of m sectors in a Cross Interleave Reed Solomon Code error correction fashion;

means for recording or reproducing the error-corrected data on or from said optical disc in units of (L+m+n) sectors;

buffer means for temporarily storing the recording or reproducing data such tat the recording or reproducing data is written in said buffer means at a first rate and is read out from said buffer means at a second rate different from the first rate; and means for rotating said optical disc at a rotational speed S' which is greater than or equal to S(L+m+n)/n.

15. The optical disc apparatus according to claim 14, wherein the rotational speeds S and S' are linear velocity.

* * * * *